(12) United States Patent
Deliyski

(10) Patent No.: US 9,212,643 B2
(45) Date of Patent: Dec. 15, 2015

(54) DUAL FUEL SYSTEM FOR AN INTERNAL COMBUSTION ENGINE

(71) Applicant: Delia Ltd., North York (CA)

(72) Inventor: Tzvetan Deliyski, North York (CA)

(73) Assignee: DELIA LTD., North York, Ontario (CA)

( * ) Notice: Subject to any disclaimer, the term of this patent is extended or adjusted under 35 U.S.C. 154(b) by 343 days.

(21) Appl. No.: 13/783,881

(22) Filed: Mar. 4, 2013

(65) Prior Publication Data

US 2014/0245995 A1    Sep. 4, 2014

(51) Int. Cl.
| | |
|---|---|
| *F02D 19/06* | (2006.01) |
| *F02M 43/04* | (2006.01) |
| *F02M 69/50* | (2006.01) |
| *F02M 21/10* | (2006.01) |

(Continued)

(52) U.S. Cl.
CPC ........... *F02M 69/50* (2013.01); *F02D 19/0613* (2013.01); *F02D 19/0615* (2013.01); *F02D 19/0647* (2013.01); *F02D 19/0665* (2013.01); *F02M 43/04* (2013.01); *F02D 19/0621* (2013.01); *F02D 19/0649* (2013.01); *F02D 19/0694* (2013.01); *F02D 19/081* (2013.01); *F02D 41/0025* (2013.01); *F02M 21/10* (2013.01); *Y02T 10/36* (2013.01)

(58) Field of Classification Search
CPC ... F02M 69/50; F02M 43/04; F02M 21/0221; F02M 21/10; F02M 21/08; F02D 19/0605; F02D 19/0647; F02D 19/0613; F02D 19/0615; F02D 19/0621; F02D 19/0649; F02D 19/0665; F02D 19/0694; F02D 19/081; F02D 19/08; F02D 41/0025

USPC ............................. 123/27 GE, 1 A, 576, 525
See application file for complete search history.

(56) References Cited

U.S. PATENT DOCUMENTS

| | | | | |
|---|---|---|---|---|
| 3,783,841 | A * | 1/1974 | Hirschler et al. | 123/576 |
| 3,799,125 | A * | 3/1974 | Hutchinson | 123/3 |

(Continued)

FOREIGN PATENT DOCUMENTS

| | | |
|---|---|---|
| DE | 102007028816 | 6/2007 |
| EP | 1391599 A1 | 2/2004 |

(Continued)

OTHER PUBLICATIONS

Written Opinion and International Search Report for International application No. PCT/IB2014/000470, international filing date: Feb. 25, 2014, mailed Jul. 9, 2014.

*Primary Examiner* — Lindsay Low
*Assistant Examiner* — George Jin
(74) *Attorney, Agent, or Firm* — Brooks Kushman P.C.

(57) ABSTRACT

A dual fuel system provides first and second fuels to internal an engine. Both fuels are stored in a storage tank, separated by a flexible membrane. A fuel rail receives either or both of the fuel types and distributes the fuels to fuel injectors. Upon shutdown of the engine, the second fuel is evacuated from the fuel rail into an auxiliary tank. The first fuel is subsequently supplied to the fuel rail from the storage tank. Upon a restarting of the engine after a predetermined time subsequent to the shutdown of the engine, the first fuel from the fuel rail is used for combustion. The second fuel from the auxiliary tank is then slowly bled into the engine or intake manifold. As the first fuel from the storage tank continues to supply the fuel rail, and the second fuel begins to supplement the first fuel in the fuel rail.

20 Claims, 6 Drawing Sheets

(51) Int. Cl.
*F02D 19/08* (2006.01)
*F02D 41/00* (2006.01)

(56) References Cited

U.S. PATENT DOCUMENTS

| | | | | |
|---|---|---|---|---|
| 4,416,244 A | * | 11/1983 | McDonald | 123/577 |
| 5,033,444 A | * | 7/1991 | Kaufman et al. | 123/527 |
| 5,074,272 A | * | 12/1991 | Bostick et al. | 123/514 |
| 5,159,911 A | * | 11/1992 | Williams et al. | 123/467 |
| 5,379,740 A | * | 1/1995 | Moore et al. | 123/478 |
| 5,479,906 A | * | 1/1996 | Collie | 123/525 |
| 5,623,907 A | * | 4/1997 | Cotton et al. | 123/456 |
| 5,775,281 A | * | 7/1998 | Smith | 123/179.8 |
| 5,775,282 A | * | 7/1998 | Smith | 123/179.8 |
| 6,227,173 B1 | * | 5/2001 | Bennett | 123/468 |
| 6,250,290 B1 | | 6/2001 | Mullen | |
| 7,506,638 B2 | * | 3/2009 | Shinkarenko et al. | 123/514 |
| 8,245,695 B2 | | 8/2012 | Martin | |
| 2005/0205021 A1 | * | 9/2005 | Shute | 123/27 GE |
| 2007/0125338 A1 | * | 6/2007 | Kato et al. | 123/304 |
| 2009/0070008 A1 | * | 3/2009 | Batenburg et al. | 701/103 |
| 2010/0030451 A1 | * | 2/2010 | Lippa et al. | 701/104 |
| 2011/0011369 A1 | * | 1/2011 | Jaasma et al. | 123/304 |
| 2011/0017174 A1 | * | 1/2011 | Ulrey et al. | 123/456 |
| 2011/0132286 A1 | | 6/2011 | Leone et al. | |
| 2011/0290203 A1 | * | 12/2011 | Pursifull | 123/41.08 |
| 2012/0145126 A1 | * | 6/2012 | Krug et al. | 123/447 |
| 2013/0125867 A1 | * | 5/2013 | Krug | 123/575 |

FOREIGN PATENT DOCUMENTS

| | | |
|---|---|---|
| GB | 2452141 A | 2/2009 |
| WO | 2011/050289 A2 | 4/2011 |

* cited by examiner

DUAL FUEL SYSTEM FOR AN INTERNAL COMBUSTION ENGINE

TECHNICAL FIELD

The present disclosure relates to a fuel system in a vehicle, specifically a dual fuel system for an internal combustion engine.

BACKGROUND

Internal combustion engines in vehicles are known in the art to run on a plethora of fuel types. Especially in recent times, it has become imperative that automotive vehicles improve fuel efficiency. The desire for fuel efficiencies in vehicles has been driven by concerns for the environment, by the cost of gasoline and fossil fuels, by legislatorial initiatives, and by other reasons. Gasoline remains the most used fuel in vehicles having an internal combustion engine. Liquefied petroleum gas (LPG) is also known as a fuel source for engines. Advantages of using LPG in vehicles include lower costs per volume, lower emissions, and reduced engine noise, among others.

Advancements have been made in the research and development of dual fuel arrangements for an internal combustion engine. These dual fuel arrangements utilize two different fuel types to run one or more engines. However, the practice of dual fuel systems in vehicles is still relatively rudimentary, and much room exists for additional technological advancements with these systems.

SUMMARY

According various embodiments, a dual fuel system for a vehicle is provided. The vehicle is capable of being propelled by two different fuels. At least one supply tank includes a first compartment for supplying a first fuel, and a second compartment for supplying a second fuel. A fuel rail is capable of delivering the first fuel and the second fuel to fuel injectors. At least one fuel line connects the first and second compartments of the supply tank to the fuel rail. At least one valve is disposed along the at least one fuel line for selectively distributing the first and second fuels from the supply tank to the fuel rail. An evacuation line has an inlet fluidly connected to the fuel rail, and an outlet fluidly connected to an evacuation tank. An evacuation valve is disposed along the evacuation line for selectively communicating fuel from the fuel rail to the evacuation tank. At least one controller is programmed to open the evacuation valve to evacuate the second fuel from the fuel rail into the evacuation tank in response to an engine-OFF signal. The at least one controller is further programmed to subsequently open the at least one valve to deliver the first fuel into the fuel rail, and controllably inject the first fuel via the fuel injectors at a first rate in response to an engine-ON signal. An intake manifold is also provided, along with an evacuation injector disposed between the evacuation tank and the intake manifold. The at least one controller is further configured to controllably inject the second fuel from the evacuation tank via the evacuation injector to the intake manifold at a second rate less than the first rate. A cooling injector is controlled to inject the second fuel into a cooling compartment of the fuel rail.

According to another embodiment, a dual fuel system for an engine is provided. The system includes at least one supply tank for storing and supplying a first fuel and a second fuel. A fuel rail is capable of delivering the first fuel and the second fuel to fuel injectors. An auxiliary holding tank is provided for storing the second fuel outside of the at least one supply tank. At least one controller is configured to evacuate the second fuel from the fuel rail into the holding tank based at least upon the engine being disabled. The at least on controller is further configured to return the second fuel from the auxiliary holding tank to an intake of the engine based upon the engine being restarted.

According to yet another embodiment, a method of providing a first fuel and a second fuel for operation of a vehicle having an engine and a fuel rail is provided. An engine-OFF signal is received. Based at least upon the engine-OFF signal, the second fuel is evacuated from the fuel rail into a holding container. The first fuel is then supplied to the fuel rail subsequent to the evacuating, to replace the second fuel with the first fuel. An engine-ON signal is received. Based at least upon the engine-ON signal, the first fuel is supplied to the engine at a first rate. Subsequently, the evacuated second fuel is supplied from the holding tank to the engine at a second rate less than the first rate.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
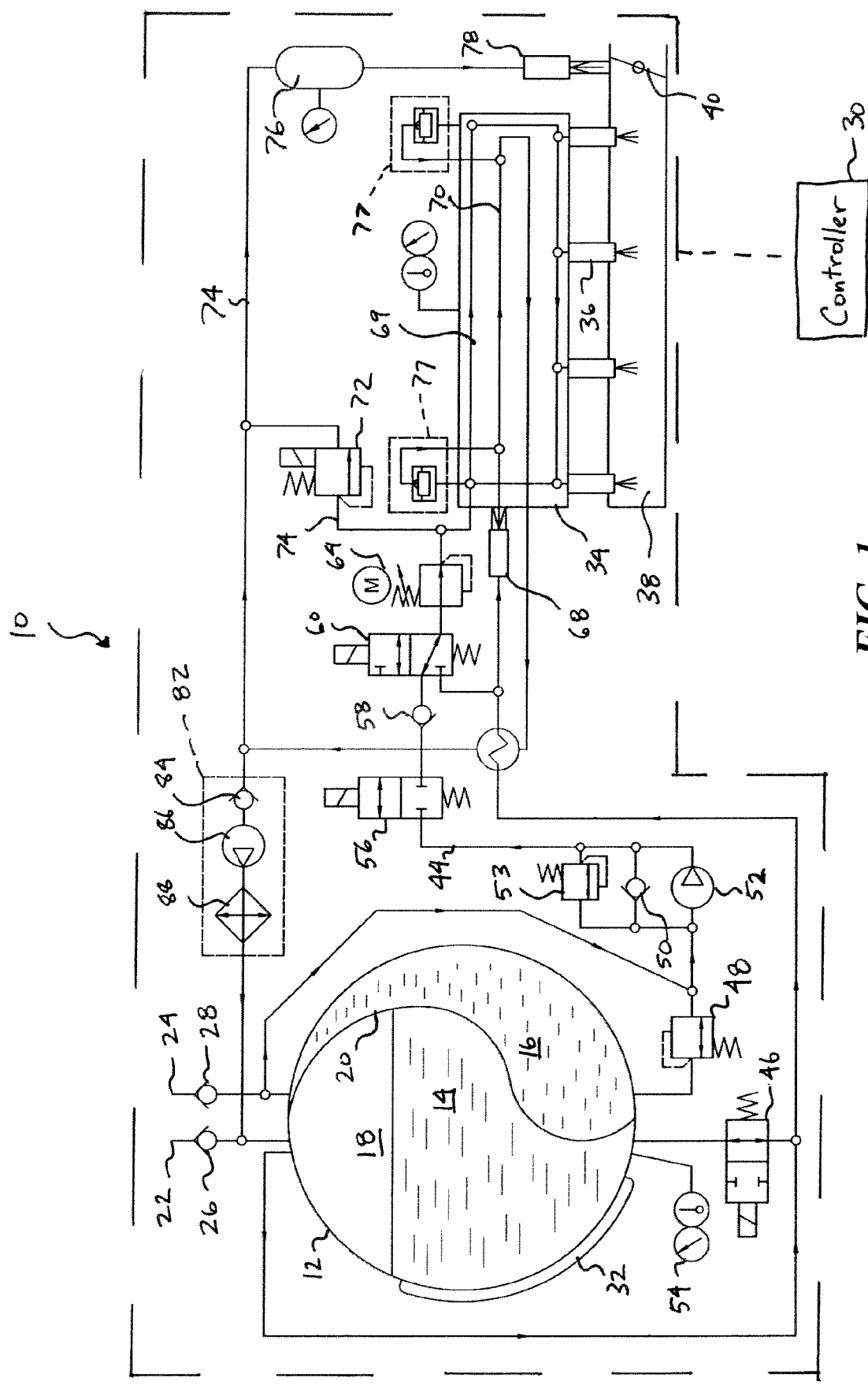
FIG. 1 is a schematic illustration of a dual fuel system according to one embodiment.

Referring to FIG. 1, a dual fuel system 10 is illustrated for use in a vehicle having an internal combustion engine. A dual fuel tank 12 is configured to receive and store a first and second fuel type in separate respective compartments. For example, as illustrated in FIG. 1, liquefied petroleum gas (LPG) 14 and gasoline 16 are stored in two separate compartments. While the LPG can be in the form of a liquid, as represented by numeral 14, a gaseous LPG 18 can exist above the liquid LPG 14 in the same partitioned container within the dual fuel tank 12. It should be understood that the dual fuel tank 12 can also be two separate tanks, each for storing a respective fuel, rather than one singular dual fuel tank.

While LPG and gasoline are referenced throughout the present disclosure, it should be understood that many fuel types are contemplated in the dual fuel system 10. For example, ethanol, biodiesel, hydrogen and other fuels are to be considered within the scope of the present disclosure and can be separated within the same tank 12 to be used for the same engine. The different fuels used for combustion can broadly be referred to as a "first fuel" and a "second fuel."

A flexible wall or membrane 20 separates the two different types of fuel into respective compartments. The membrane 20 is elastic or otherwise bendable to accommodate various volumes and pressures within the separate compartments that have LPG 14 or gasoline. Pressure differentials between the two fuel types expand, bend or otherwise move the membrane 20 accordingly.

An LPG inlet 22 provides an opening to a pathway into the LPG portion of the tank 12. Similarly, a gasoline inlet 24 provides an opening to a pathway into the gasoline portion of the tank 12. Each inlet 22, 24 has respective check valves 26, 28 to prevent the fuel from exiting from the tank 12 through the inlet.

At least one controller 30 controls the operation of the mechanics (fuel injectors, valves, pumps, etc.) within the dual fuel system 10. The controller 30 receives input signals from various sensors throughout the system 10 and commands actions based on the retrieved signals. Electric connections connect the controller 30 to various components in the dual fuel system 10 to receive the data and, in turn, command actions based on the data. Any reference in the present disclosure to a command, control, mechanical action, electrical action, or other action may refer to decisions made and instructed by the controller 30. For example, valves opening and shutting should be understood as being commanded to do so by the controller 30.

A warming pad 32 may be provided mounted or otherwise secured to the exterior or interior of the tank 12. The warming pad 32 regulates the temperature of the LPG portions 14, 18 of the tank 12, thereby regulating the pressure of the LPG. Temperature regulation of the fuels, especially the LPG 14, may be necessary in order to regulate the pressure of the fuel not only within the tank 12 but throughout the dual fuel system 10. For example, if the weather is cold, the pressure of the LPG may be below the required pressure in the fuel rail 34, making combustion of LPG undesirable or impossible. Warming of the LPG in cold weather enables a quicker conversion to LPG during operation. The warming pad 32 can be controlled by the controller 30 and sensors in order to regulate the temperature and pressure of the LPG 14 and/or gasoline 16 within the tank 12. The warming pad 32 may also have a refrigerant or coolant within to cool the fuel tank 12 if necessary. Gaseous LPG may also be removed to cool the LPG, as will be later described.

In operation, the LPG 14 and/or gasoline 16 is routed and fed (through pathways and devices that will be subsequently discussed) into a fuel rail 34. The fuel rail 34 may be a pipe or duct for receiving fuel and transporting the fuel to a plurality of fuel injectors 36. The fuel injectors 36 are timed and controlled via the OEM engine management system and/or controller 30 to inject LPG, gasoline or other fuel into an intake manifold 38, whereupon the fuel mixes with air and is inputted into ports corresponding to respective engine cylinders. In this embodiment, a throttle 40 is controlled to open and close to affect the amount of air or oxygen intake into the manifold 38. Alternatively, the fuel may be injected directly into respective cylinders of the engine in a direct injection configuration.

For similar temperature regulation reasons as the fuel tank, insulation may be provided around the outside of the fuel rail, any components and lines connected to the fuel rail, and the fuel tank. The fuel rail 34 should be kept relatively cold upon receiving a signal to supply LPG to the fuel rail and when the engine is running on LPG, such that the pressure is regulated when LPG is used in a liquid state. Fuel lines and at least a portion of the fuel tank housing the LPG fuel can also be similarly insulated. The insulation may be made of polyurethane, mineral wool, aerogel, or any other insulation material known in the art.

An LPG fuel line 42 directly or indirectly connects the LPG portion of the tank 12 (gaseous or liquid) to the fuel rail 34. The LPG (gaseous 18 or liquid 14) travels along fuel line 42 to the fuel rail 34. Similarly, a gasoline fuel line 44 directly or indirectly connects the gasoline portion 16 of the tank 12 to the fuel rail.

An LPG valve 46 and a gasoline valve 48 are provided along the fuel lines 42, 44, respectively. The vales 46, 48 may be either electrically activated or pressure activated in various embodiments. The valves 46, 48 are controlled to regulate the output of the different fuels from the tank 12. A check valve 50 is also located along the fuel line 44 that corresponds with a fuel pump 52. The fuel pump 52 can be commanded to pump fuel through the fuel line 44, while the check valve 50 enables shut down of the pump 52 in the event of a sensed pressure or temperature within the tank 12 that is inside of a desired threshold, as determined by temperature and pressure sensors 54. Furthermore, if the pressure in the tank 12 is above a threshold, the fuel can flow through check valve 50 without the assistance of the pump 52. A two-way valve may also be provided in combination with the valve 50 and pump 52 such that excess gasoline can flow back through the two-way valve and toward the tank. Additional valves 56, 58, 60 are also provided along the fuel lines to regulate the flow of fuel from either or both of the LPG and gasoline portions of the fuel tank 12. Valve 60 can be a dual fuel valve such that in one state the valve 60 enables gasoline to flow from gasoline fuel line 44 into the fuel rail 34, and in another state the valve 60 enables LPG to flow from the LPG fuel line 42 into the fuel rail 34. Other embodiments are contemplated in which a plurality of valves are utilized to regulate the fuel flow of first and second fuels into the fuel rail 34. Furthermore, valve 60 can be of such shape and type that allows not only supplying either fuels to the fuel rail 34, but also mixing of these fuels to any desirable proportion suitable for combustion. For example, in diesel engines in which the first fuel cannot be 100% substituted, the second fuel can be pre-mixed with the first fuel for fuel efficiency benefits before injection.

A pressure reducing valve 64 may be placed along either or both LPG fuel line 42 or gasoline fuel line 44 upstream of the fuel rail 34. The pressure reducing valve 64 reduces pressure along the fuel lines for controlling the pressure of the fuel before fuel enters the fuel rail 34. For example, liquid LPG may be 10 bar in the tank 12 and throughout portions of the fuel line 42 upstream of the pressure reducing valve 64. This high amount of pressure may be unsuitable for injection. The pressure reducing valve 64 reduces the pressure of the LPG before injection such that the pressure is more comparable with that of gasoline pressure during injection (e.g., between 2 to 6 bar). The pressure reducing valve 64 may be equipped with a motor or another actuator to regulate fuel pressure along throughout the fuel rail 34.

Because of the different characteristics of various fuels (e.g., LPG and gasoline), the fuel rail 34 must be intelligently configured to properly distribute the different fuels for injection. For example, if the engine of the vehicle is relatively cold when started, immediate injection of LPG may not combust as efficiently or rapidly compared to gasoline due to the combustion characteristics of LPG. Therefore, the controller 30 should use temperature and pressure sensors 66 in the fuel rail 34 and other sensors outside of the fuel rail 34 to control the various valves in the dual fuel system to time when each fuel is sent into the fuel rail. Furthermore, for metering accuracy and combustion efficiency reasons, it is desirable to maintain the LPG fuel in a liquid state in the fuel rail during injection. Because of different temperature and pressure change-of-state characteristics of gasoline compared to LPG, when using a singular fuel rail 34 for both fuels, the LPG must be maintained at a sufficient temperature and pressure to properly inject immediately after/before gasoline injection. Given these considerations and a limited injection pulse duration at high engine speeds, the present disclosure includes chilling the LPG fuel and rail so that a normal fuel rail pressure will maintain the LPG fuel in a liquid phase. The use of LPG fuel can occur immediately on engine start (or within seconds thereafter) if the fuel rail 34 is below a temperature threshold, for example, in cold weather or shortly after the engine being previously on. LPG injection can also occur immediately after engine startup in a direct injection engine, where the fuel pressure is high. However, the engine may initially be started using gasoline fuel, according to known methods, in the event of a cold start. These and other concerns will be discussed with reference to illustrations provided in FIGS. 2-4.

Figure 2:
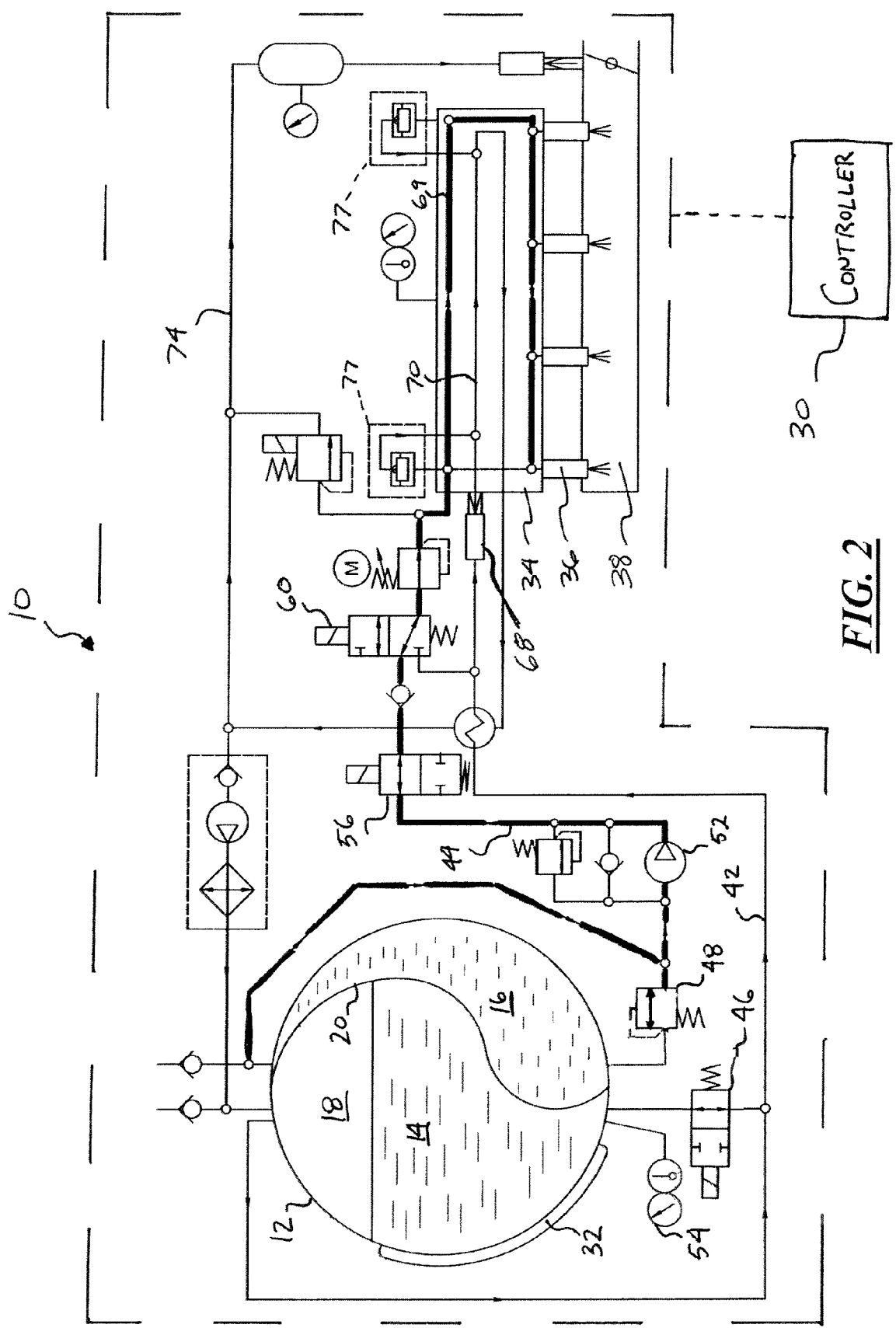
FIG. 2 is a schematic illustration of a dual fuel system operating in a gasoline-fueling mode.

Referring to FIG. 2, a gasoline-mode of operation is illustrated in which gasoline 16 is provided to the engine for combustion as indicated by the bolded lines. This mode may start immediately upon engine-ON signals in which an operator turns the engine on. In this mode, valve 56 is open to allow gasoline 16 to flow along gasoline fuel line 44. The controller 30 also commands the dual fuel valve 60 to be positioned such that gasoline (and not LPG) flows through the valve 60 into the fuel rail 34. Inside the fuel rail 34, the gasoline flows along a fueling compartment 69 of the fuel rail 34 towards the fuel injectors 36 for being provided to the manifold 38 or into the cylinders in direct injection engines for combustion.

To input gasoline into the fuel rail 34, an upper port and lower port on the gasoline portion 16 of the tank 12 are provided. If liquid LPG resides in the LPG portion 14 of the tank 12, and the temperature is above a threshold, pressure above atmospheric pressure is provided to the gasoline portion 16 of the tank 12 through the flexible membrane 20. In that case, gasoline is drawn from the upper port and through either the check valve 50 (if the pressure is above the required pressure in the fuel rail 34), or through the pump 52 if the pressure is insufficient. If no liquid LPG resides in the LPG portion 14 of the tank 12, there may be no pressure in the tank, valve 48 opens, and the gasoline flows form the lower port of the gasoline portion 16 of the tank 12.

In the gasoline-mode of operation, a cooling injector 68 may be activated to inject a fuel into a cooling compartment 70. The cooling injector 68 may inject LPG from the LPG fuel line to utilize the LPG as a coolant. After the LPG is circulated along the cooling compartment 70, the LPG may exit the fuel rail 34 via evacuation line 74 and into a holding tank 76 in which the LPG may be subsequently bled into the manifold 38 for combustion, which will be discussed further. Additionally or optionally, the LPG may be transferred from the fueling compartment 69 into the cooling compartment 70 via an optional relief valves 77. Relief valve 77 may be a floater type valve, in which the valve 77 opens to allow gaseous substances in the fueling compartment 69 to escape to the cooling compartment if the level of the liquid LPG or gasoline in the fuel compartment becomes low.

The rate of injection of LPG through the cooling injector 68 can be controlled to slowly increase toward the rate of impulses of fuel injectors 36. Once the impulse rate of injection of LPG is proportional to the impulse rate of injection of fuel via fuel injectors 36, the amount of extra fuel added proportional to the gasoline injection can be at least temporarily maintained. Simultaneously, the pressure of the gasoline in the fuel rail 34 could be decreased, which reduces the amount of gasoline injected into the engine while increasing the amount of LPG injected for cooling. Once the LPG input rate is maintained, the reduction of gasoline fuel pressure stops and the cooling continues with a constant proportion between the two fuels, until a desired temperature in the fuel rail 34 is reached. With this arrangement and control, the controller 30 is not required to adjust the length of injection pulses for the added LPG fuel. The decrease in pressure of the gasoline compensates for the added LPG fuel for cooling purposes.

The cooling of the fuel rail can also be accomplished by other contemplated methods. For example, a small heat pump unit and/or refrigerating unit can be in communication with the inside of the fuel rail 34. The heat pump can be arranged instead of a cooling injector 68 to circulate known coolant throughout the fuel rail in a closed circuit. Other methods of cooling the fuel rail 34 are contemplated.

Figure 3:
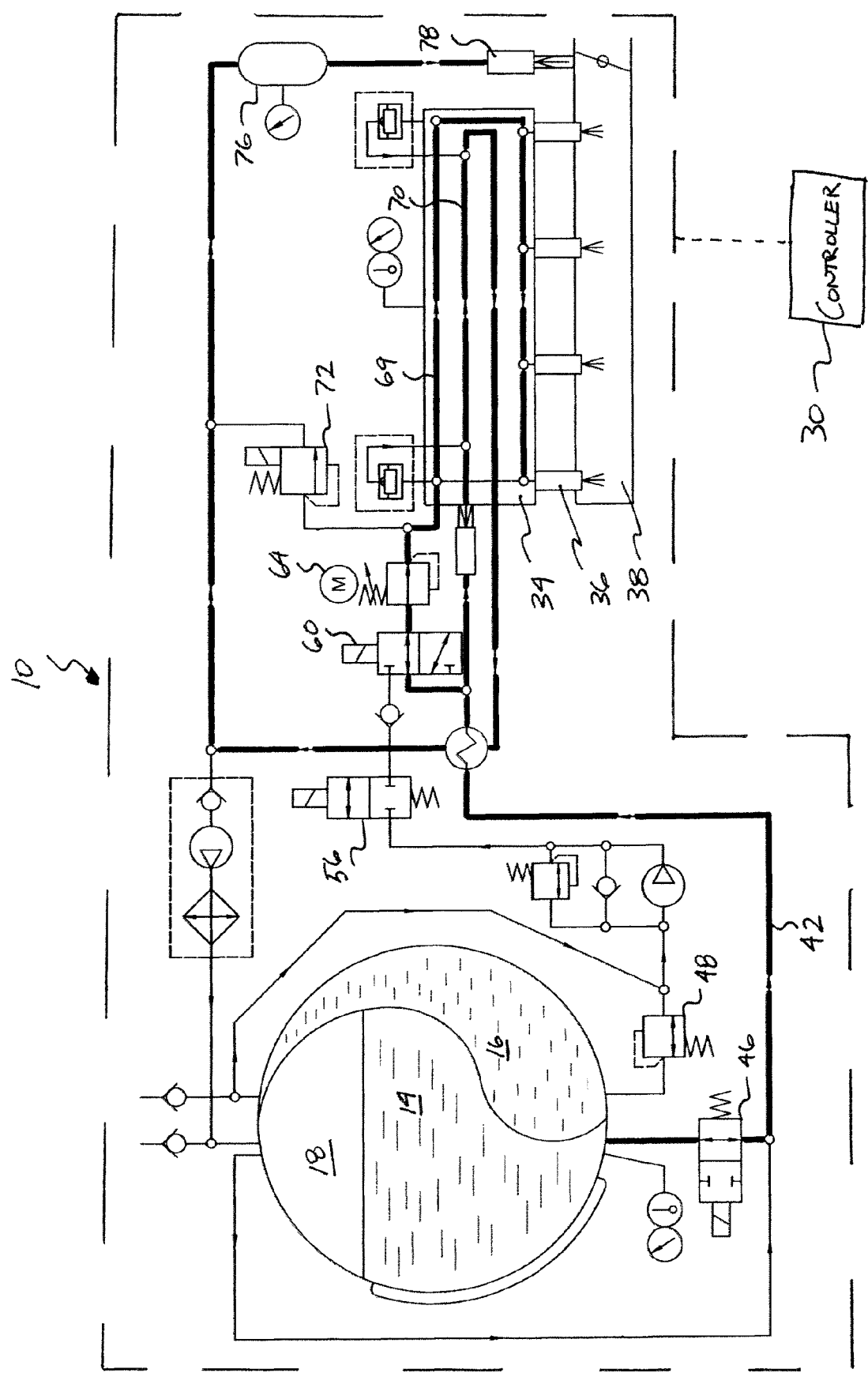
FIG. 3 is a schematic illustration of the dual fuel system operating in an LPG-fueling mode.

Referring to FIG. 3, an LPG-mode of operation is illustrated in which the controller 30 determines optimum situations for LPG injection based on temperature and pressures of the fuels and components within the vehicle. For example, this mode of operation may be activated after minutes of driving in which certain components decrease in temperature.

In the LPG-mode of operation, the controller 30 commands the LPG valve 46 to open to enable liquid LPG 14 to transfer along the LPG fuel line 42 into the fuel rail 34. Alternatively or additionally, gaseous LPG 18 may also be mixed into the liquid LPG along the LPG fuel line 42. The gasoline valve 56 may be at least partially closed to at least partially inhibit the flow of gasoline into the fuel rail 34. Valve 60 and 64 are configured to enable the flow of LPG fuel into the fueling compartment 69 of the fuel rail 34, whereupon the injectors 36 spray the LPG into the intake manifold 38 for combustion or in cylinders in direct injection engines. Similar to the gasoline-mode of operation illustrated in FIG. 2, in the LPG-mode of operation LPG can be distributed into the cooling compartment 70 of the fuel rail.

The timing of the switch from the gasoline-mode to the LPG-mode of operation can be controlled by controller 30 based on temperatures and pressures, as previously described. Furthermore, during the transition period between the two modes of operation, the valves (e.g., valves 56, 60) can be at least partially open to enable a partial amount of gasoline to mix with the LPG fuel in the fuel rail 34, if desired.

Once the operator of the vehicle commands the engine to stop and the engine remains stopped for a period of time, liquid LPG injection may be difficult due to the lack of ability to regulate the temperature of the fuel rail 34. As heat distributes through the vehicle once the engine is disabled, fuel in the fuel rail may increase in heat and possibly vaporize any LPG in the fuel rail due to the lack of circulation of any coolant in the cooling compartment 70. Once the LPG is vaporized, ignition may be impossible or at least very troublesome due to the ignition characteristics of LPG. A pressure release valve 72 may therefore be provided to enable the LPG in the fuel rail 34 to evacuate from the fuel rail 34 into the holding tank 76. The pressure release valve 72 is also provided to safely release any high pressure in the fuel compartment of the fuel rail 34 if power is lost and LPG evacuation cannot be done when the engine stops. A method of enabling a successful restart of the engine according to one embodiment of the present disclosure is described with reference to FIG. 4.

Figure 4:
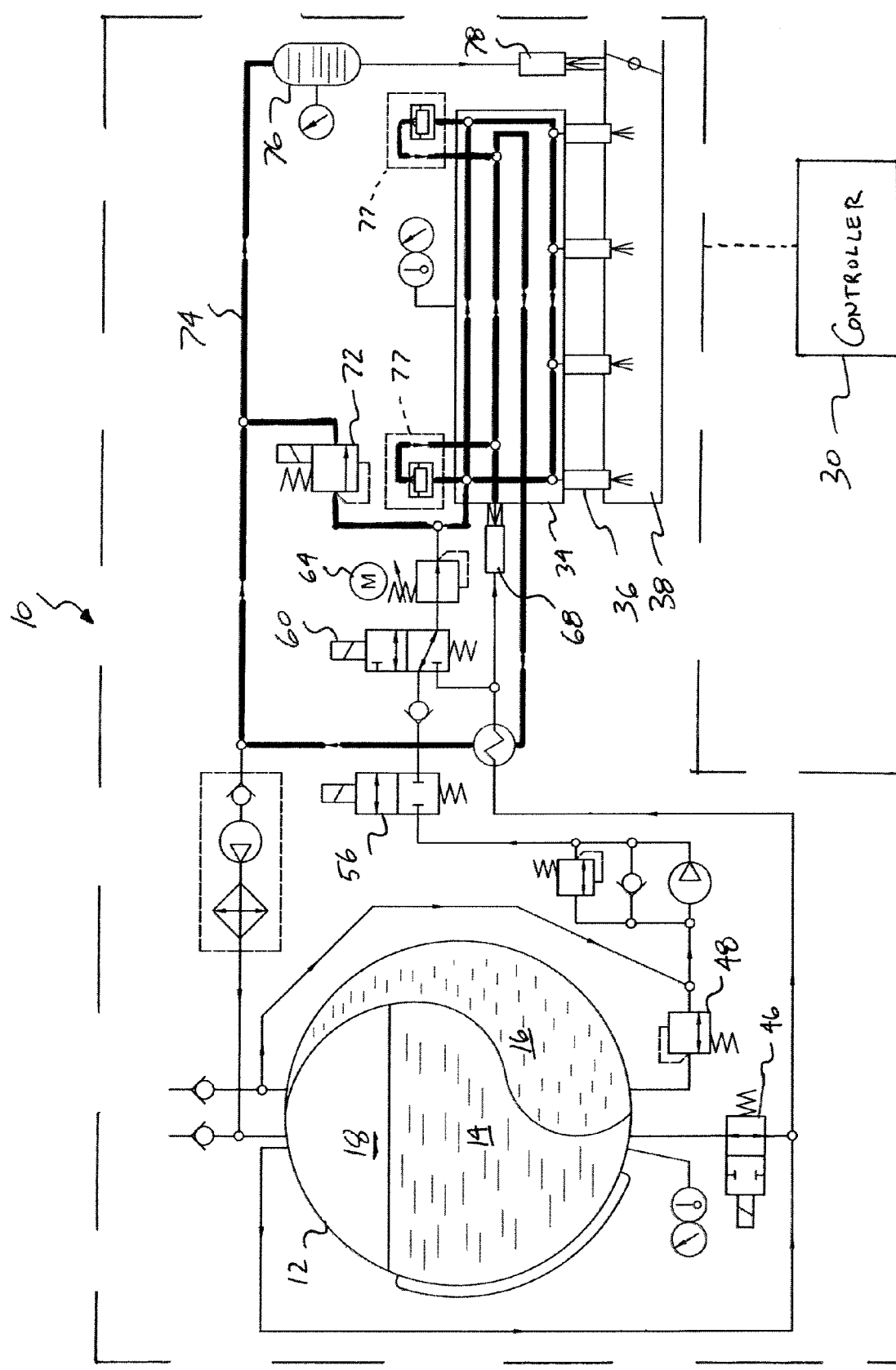
FIG. 4 is a schematic illustration of the dual fuel system evacuating LPG from the fuel rail before depositing gasoline into the fuel rail.

Referring to FIG. 4, an evacuation-mode of operation is illustrated in which LPG is evacuated from the fuel rail 34. In response to the engine being stopped for a time exceeding a threshold, or in response to the temperature of components (e.g., the fuel rail 34) within the vehicle, the controller 30 may command the evacuation-mode of operation. The pressure release valve 72 can be opened such that the LPG in the fuel rail 34, which is under pressure, escapes through evacuation fuel line 74 into an evacuation tank, or low pressure holding tank 76. After a short time (e.g., 0.1-2.0 seconds), the LPG is evacuated from the fuel rail 34 and the controller 30 closes pressure release valve 72. Additionally, the LPG remaining in the fuel rail 34 may be evacuated via an optional relief valves 77 and/or distributed in manners previously described toward the holding tank 76.

It should be understood that the pressure release valve 72 can be a safety release valve such that it opens in response to a pressure amount (above the pressure in the fuel rail 34). In the event of a loss of electricity in the vehicle, a malfunction in the control system, or merely overheating in the fuel rail 34, the pressure release valve 72 can open to safely release the LPG from the fuel rail 34 as the temperature of the rail 34 increases. Subsequent to the evacuation, the valves 56, 60 may be controlled to move and enable gasoline to enter into the fueling compartment 69 of the fuel rail 34. Gasoline flooded into the fuel rail 34 enables the engine to be restarted with gasoline even if the engine was previously utilizing LPG fuel the last time the engine was on.

After the substitution of LPG for gasoline in the fuel rail 34, the engine may be restarted with gasoline providing fuel for the initial combustion cycle. Furthermore, the stored LPG evacuated from the fuel rail 34 and stored in the low pressure holding tank 76 may be bled into the intake manifold 38. An LPG injector 78 is controlled to slowly release the stored LPG into the manifold 38 to mix with the gasoline injected from the fuel rail 34. Alternatively, the LPG injector 78 may be controlled to not release any LPG until the next mode switch from the gasoline-mode of operation to the LPG-mode of operation.

It should be understood that the injector 78 may spray the LPG directly into the cylinders in a direct injection configuration; however, in a preferred embodiment, the injector 78 sprays fuel into the manifold 38 where it mixes with fuel injected from the fuel rail 34. The controller 30 may command the injector 78 to spray LPG based upon a time threshold after restart, various temperature and pressure measurements, and/or a time when LPG is injected into the cooling compartment 70 of the fuel rail 34. The rate of injection is preferably proportional to the rate of injection by the main injectors 36.

During the evacuation mode, valve 46 may be open, but LPG may still be inhibited from entering the fuel rail 34 due to fuel injector 68 not operating and valve 60 being closed. In the event of a need to cool the tank 12, valve 46 may close and gaseous LPG may be drawn from the gaseous LPG portion 18 of the fuel tank. The reduction of pressure from the removal of gaseous LPG causes some of the liquid LPG to boil, thus cooling the tank 12. When the temperature in the tank 12 cools to a temperature below a preset value, valve 46 may open again such that LPG is drawn in a liquid form for use.

Referring to FIGS. 1-4, a return subsystem 82 is optionally provided to return unused (gaseous) LPG back into the tank 12 for storage and future retrieval. The subsystem 82 can include a check valve 84 such that fuel cannot be returned through the subsystem 82 into the fuel rail 34 and/or storage tank 76. A vapor pump 86 pumps the LPG back into the tank during, for example, the evacuation of LPG from the fuel rail 34 or fuel lines and during cooling down of the fuel rail 34. A cooler 88 can also be provided to cool the gaseous LPG such that it is liquefied before entering the tank 12. Valves 77 are also optionally provided to remove any gaseous substances from the fuel rail 34.

Figure 5:
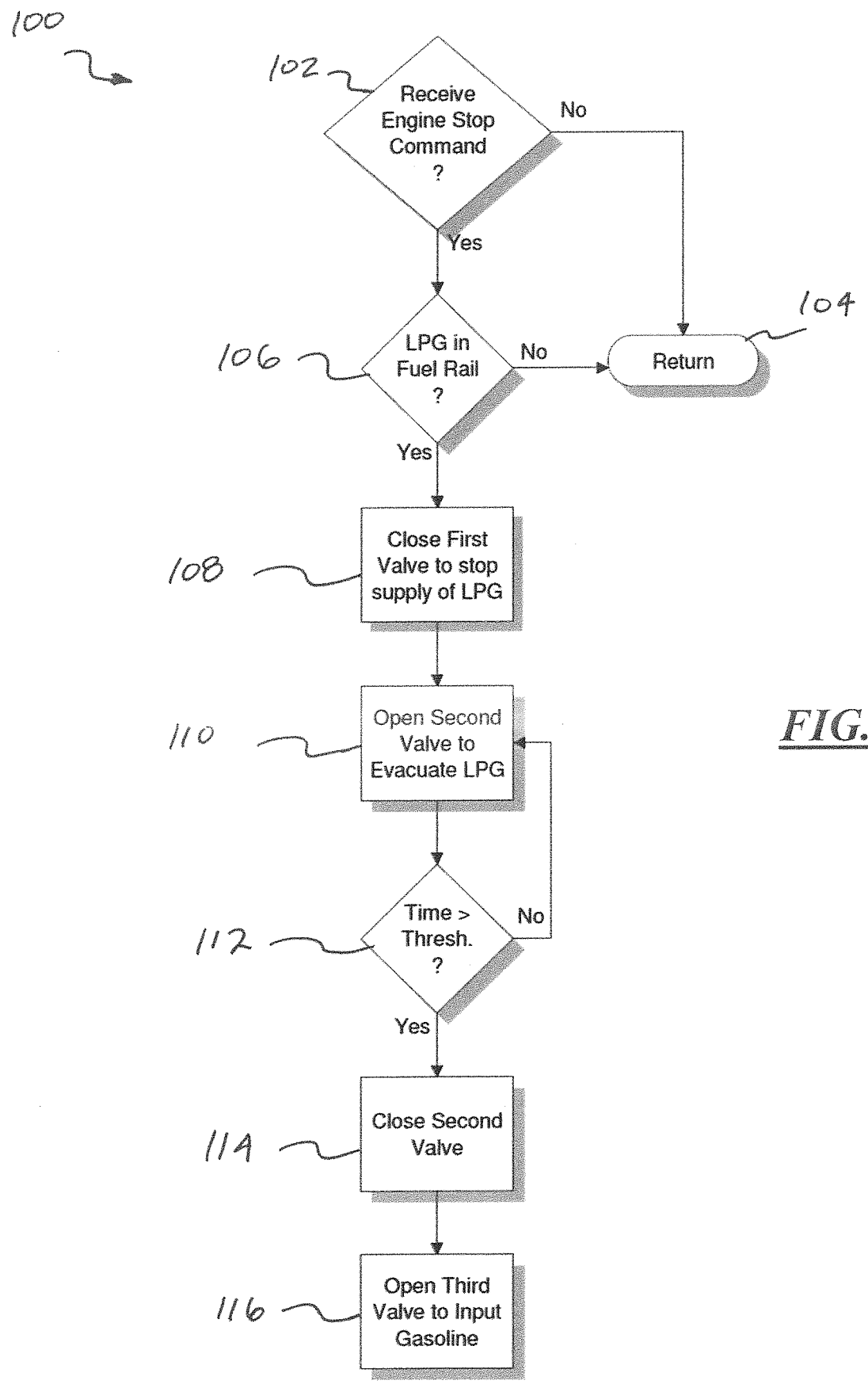
FIG. 5 is a flowchart illustrating an algorithm implemented by at least one controller.

Referring to FIG. 5, a method for replacing LPG (or a second fuel) in the fuel rail 34 is illustrated at 100. The method 100 can be implemented by at least one controller 30. At operation 102, the controller receives an engine stop command. This can be indicated by an operator of the vehicle turning the key OFF to disable ignition. If such a signal is not requested, the method returns and repeats at operation 104 to continuously check for engine stop commands. At operation 106, a determination is made as to whether LPG remains in the fuel rail 34. This can be determined, for instance, based on the timing of the valves in the system 10, the selected mode of operation ("LPG" or "gasoline" mode) as inputted by the operator, or previous timing of the injector 68. If no LPG remains in the fuel rail 34, the method returns at operation 104.

If there is LPG in the fuel rail 34, a command is made to close valve 60 to stop the supply of LPG to the fuel rail 34, then at operation 110 a command is made to open a second valve (valve 72, for example). The opening of the valve 72 releases the LPG due to the pressure in the fuel rail 34, as previously described with reference to FIG. 1. The LPG gas is evacuated from the fuel rail 34 and into the holding tank 76. The valve opening at operation 110 may also be commanded to occur after a time (e.g., 5 minutes) after the engine being disabled. The valve 72 remains open until a time increases above a predetermined threshold (e.g., 0.1-2.0 seconds) as determined at operation 112. Once the time threshold has been matched, the valve 72 is commanded to close at operation 114 to fluidly separate the fuel rail 34 and the holding tank 76. LPG evacuated from the fuel rail 34 is stored in the holding tank 76. At operation 116, a third valve (valve 56, for example) is opened or otherwise configured to allow for fluid communication between the gasoline fuel line 44 and the fuel rail 34. A pump may be necessary to input gasoline into the fuel rail 34. The method 100 enables gasoline to be used when the engine is next started in the event LPG was previously used during the last shutdown of the engine.

Figure 6:
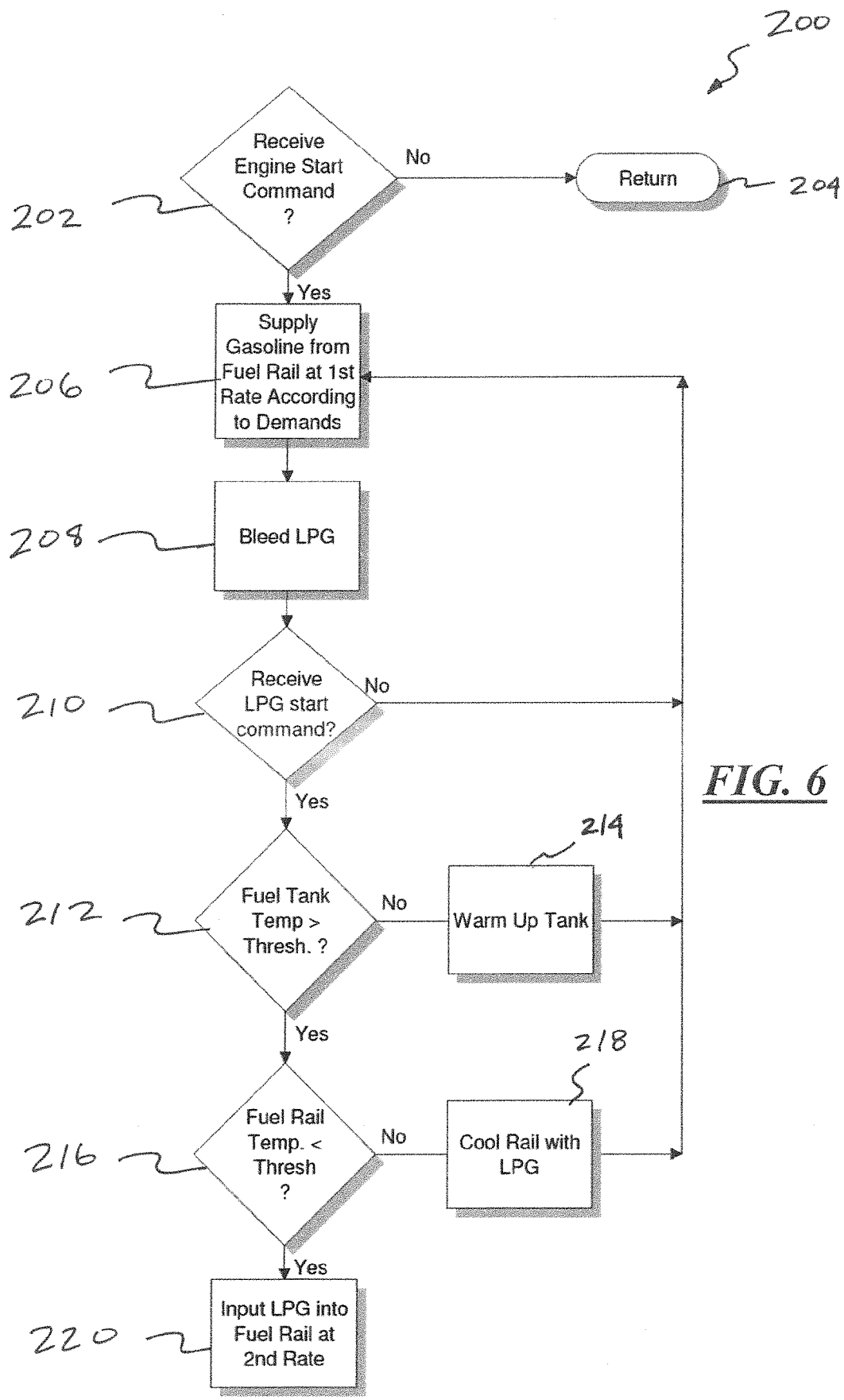
FIG. 6 is another flowchart illustrating an algorithm implemented by at least one controller.

Referring to FIG. 6, a method for controlling fuel distribution during a subsequent restart of the engine is illustrated at 200. The method can be implemented by at least one controller 30. At operation 202, it is determined whether the controller receives an engine start command. This can be indicated by an operator of the vehicle turning the key ON to command ignition. If such a signal is not requested, the method returns at operation 204. At operation 206, gasoline is supplied from the fuel rail 34 to the intake manifold 38 via injectors 36 for initial ignition.

At operation 208, LPG can be bled from the storage tank 76. This can occur regardless of temperature of the fuel rail, since the LPG is being directly bled into the intake manifold 38 to remove the excess LPG from the storage tank 76. The rate of the bleeding of the LPG may be dependent upon the input demands from the user as well as injection timing of the fuel injectors 36. It should be understood that the LPG stored in the tank 76 can be bled into the manifold at any time after the starting of the engine.

During the supply of gasoline into the intake manifold 38, the controller checks for an LPG start command at operation 210. This can be initiated by user-input, or can be commanded automatically at any point during travel to attempt to operate the vehicle in a more fuel efficient manner with LPG. In order to supply the LPG, the temperature and pressure must be suitable for input into the fuel rail, as previously described. Therefore, at operation 212, the temperature of the fuel tank 12 is monitored such that the temperature must be above a threshold in order to be commanded to be input into the fuel rail 34. The warming pad 32 may be utilized to warm the LPG fuel above the temperature threshold, as previously described. If the temperature of the fuel tank 12 is not above a temperature threshold suitable for supplying the LPG for combustion, then at operation 214 the warming pad or other warming means warms at least a portion of the compartment of the fuel tank in which LPG is stored. The warming of the tank can occur at any time throughout the method 200.

The temperature of the fuel rail 34 is monitored throughout the supply of gasoline at operation 216. If the temperature of the fuel rail is greater than a threshold temperature, the fuel rail 34 may be cooled by LPG at operation 218 according to methods previously described. Once the temperature of the fuel rail 34 is below the temperature threshold, the LPG may be inputted into the fuel rail at a second rate at operation 220 to fuel the vehicle by LPG, according to methods previously described.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A dual fuel system for a vehicle capable of being propelled by two different fuels, the system comprising:
    at least one supply tank having a first compartment and a second compartment for supplying a first fuel and a second fuel, respectively;
    a fuel rail capable of delivering the first fuel and the second fuel to fuel injectors;
    at least one fuel line connecting the first and second compartments of the supply tank to the fuel rail;
    at least one valve disposed along at least one fuel line for selectively distributing the first and second fuels from the supply tank to the fuel rail;
    an evacuation tank;
    an evacuation line having an inlet fluidly connected to the fuel rail, and an outlet fluidly connected to the evacuation tank;
    an evacuation valve disposed along the evacuation line for selectively communicating fuel from the fuel rail to the evacuation tank; and
    at least one controller programmed to (i) open the evacuation valve to evacuate the second fuel from the fuel rail into the evacuation tank in response to an engine-OFF signal, (ii) subsequently open the at least one valve to deliver the first fuel into the fuel rail, and (iii) controllably inject the first fuel via the fuel injectors at a first rate in response to an engine-ON signal.

2. The system of claim 1, further comprising an intake manifold, and an evacuation injector disposed between the evacuation tank and the intake manifold, wherein the at least one controller is further configured to controllably inject the second fuel from the evacuation tank via the evacuation injector to the intake manifold at a second rate less than the first rate.

3. The system of claim 1, wherein the at least one controller is further programmed to deliver the second fuel from the supply tank into the fuel rail subsequent to the engine-ON signal at a second rate generally equal to the first rate.

4. The system of claim 1, wherein the at least one supply tank is one supply tank, the system further comprising further comprising a flexible membrane disposed within the supply tank that separates the first compartment and the second compartment.

5. The system of claim 1, wherein the first fuel is gasoline and the second fuel is liquefied petroleum gas (LPG).

6. The system of claim 1, wherein the at least one controller is further programmed to open the evacuation valve to evacuate the second fuel from the fuel rail into the evacuation tank via the evacuation line in response to the engine being OFF for a time exceeding a threshold.

7. The system of claim 1, further comprising a cooling injector capable of delivering the second fuel to a cooling compartment of the fuel rail, wherein the at least one controller is further programmed to switch the at least one valve to deliver the second fuel into the fuel rail, and to open the cooling injector to cool the rail.

8. The system of claim 7, further comprising an insulation layer disposed about at least a portion of the fuel rail to inhibit an increase in temperature of the fuel rail during the delivery of the second fuel into the fuel rail.

9. The system of claim 1, further comprising a warming pad disposed about at least a portion of the second portion of the supply tank, wherein the at least one controller is further programmed to deliver the second fuel from the supply tank into the fuel rail based upon a temperature of the second fuel exceeding a temperature threshold.

10. A dual fuel system for an engine, comprising:
    at least one supply tank for supplying a first fuel and a second fuel;
    a fuel rail capable of delivering the first fuel and the second fuel to fuel injectors;
    an auxiliary holding tank for storing the second fuel; and
    at least one controller configured to (i) evacuate the second fuel from the fuel rail into the holding tank based at least upon the engine being disabled, and (ii) return the second fuel from the auxiliary holding tank to an intake of the engine based upon the engine being restarted;
    wherein the at least one controller is further configured to input the first fuel into the fuel rail subsequent to the evacuation of the second fuel from the fuel rail.

11. The system of claim 10, further comprising an intake manifold wherein the at least one controller is further configured to deliver the first fuel into the intake manifold in response to an engine activation signal and subsequently deliver the second fuel from the auxiliary holding tank into the intake manifold.

12. The system of claim 11, wherein the at least one controller is further configured to deliver the first fuel into the intake manifold at a first rate in response to the engine activation signal, and subsequently deliver the second fuel from the holding tank into the intake manifold at a second rate less than the first rate.

13. The system of claim 11, wherein the at least one controller is further configured to deliver the second fuel from the supply tank into the fuel rail subsequent to the engine activation signal.

14. The system of claim 10, wherein the first fuel is gasoline and the second fuel is liquefied petroleum gas (LPG).

15. The system of claim 10, wherein the at least one controller is further configured to evacuate the second fuel from the fuel rail into the holding tank based at least upon the engine being disabled for a time exceeding a threshold.

16. The system of claim 10, wherein the supply tank includes a flexible membrane for isolating the first fuel from the second fuel within the supply tank.

17. A method of providing a first fuel and a second fuel from at least one tank for operation of a vehicle having an engine and a fuel rail, the method comprising:
receiving an engine-OFF signal;
evacuating the second fuel from the fuel rail into a holding container based at least upon the engine-OFF signal;
supplying the first fuel from the tank to the fuel rail subsequent to the evacuating;
receiving an engine-ON signal;
supplying the first fuel from the fuel rail to the engine at a first rate based at least upon the engine-ON signal;
determining a temperature of the fuel rail; and
supplying the second fuel into the fuel rail based upon the temperature of the fuel rail exceeding a threshold.

18. The method of claim 17, further comprising supplying the second fuel to the engine from the holding container at a second rate generally proportional to the first rate.

19. The method of claim 18, further comprising increasing the second rate toward the first rate until the first rate and second rate are generally equivalent.

20. The method of claim 17, further comprising heating the tank in response to the tank being less than a temperature threshold, and supplying the second fuel into the fuel rail based upon the temperature of the fuel rail exceeding a threshold.

* * * * *

UNITED STATES PATENT AND TRADEMARK OFFICE
CERTIFICATE OF CORRECTION

| | | |
|---|---|---|
| PATENT NO. | : 9,212,643 B2 | Page 1 of 1 |
| APPLICATION NO. | : 13/783881 | |
| DATED | : December 15, 2015 | |
| INVENTOR(S) | : Tzvetan Deliyski et al. | |

It is certified that error appears in the above-identified patent and that said Letters Patent is hereby corrected as shown below:

IN THE CLAIMS

Column 10, Line 27, Claim 4:

After "is one supply tank, the system"
Delete "further comprising" (second occurrence).

Signed and Sealed this
Twelfth Day of April, 2016

Michelle K. Lee
*Director of the United States Patent and Trademark Office*